United States Patent
Ely et al.

(10) Patent No.: US 10,503,271 B2
(45) Date of Patent: Dec. 10, 2019

(54) PROXIMITY DETECTION FOR AN INPUT MECHANISM OF AN ELECTRONIC DEVICE

(71) Applicant: Apple Inc., Cupertino, CA (US)

(72) Inventors: Colin M. Ely, Cupertino, CA (US); Fletcher R. Rothkopf, Cupertino, CA (US); Baboo V. Gowreesunker, Cupertino, CA (US); Prashanth S. Holenarsipur, Cupertino, CA (US); Serhan O. Isikman, Cupertino, CA (US); Anna-Katrina Shedletsky, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 14/936,421

(22) Filed: Nov. 9, 2015

(65) Prior Publication Data

US 2017/0090592 A1    Mar. 30, 2017

Related U.S. Application Data

(60) Provisional application No. 62/235,068, filed on Sep. 30, 2015.

(51) Int. Cl.
*G06F 3/02*    (2006.01)
*G06F 1/16*    (2006.01)
*G06F 3/042*   (2006.01)

(52) U.S. Cl.
CPC .............. *G06F 3/02* (2013.01); *G06F 1/163* (2013.01); *G06F 3/042* (2013.01); *G06F 2203/04101* (2013.01)

(58) Field of Classification Search
CPC ...................................................... G06F 1/163
See application file for complete search history.

(56) References Cited

U.S. PATENT DOCUMENTS

| | | | |
|---|---|---|---|
| 3,824,587 A | | 7/1974 | Fowler |
| 4,064,688 A | * | 12/1977 | Sasaki .................... G04B 39/00 368/69 |
| 4,199,741 A | | 4/1980 | Serrus Paulet |
| 4,203,280 A | * | 5/1980 | Ziegler .................. G04G 21/08 200/600 |
| 4,275,674 A | | 6/1981 | Carbonato |
| 4,322,833 A | * | 3/1982 | Husted .................... G04G 21/08 307/116 |
| 4,336,446 A | | 6/1982 | Hafner |

(Continued)

FOREIGN PATENT DOCUMENTS

| CN | 203465677 | 3/2014 |
|---|---|---|
| WO | WO 09/023395 | 2/2009 |

(Continued)

OTHER PUBLICATIONS

U.S. Appl. No. 15/714,691, filed Sep. 25, 2017, Lin et al.
(Continued)

*Primary Examiner* — Patrick N Edouard
*Assistant Examiner* — Peijie Shen
(74) *Attorney, Agent, or Firm* — Brownstein Hyatt Farber Schreck, LLP (57) ABSTRACT

Disclosed herein is an electronic device having a proximity sensor for determining whether an object, such as a user's finger, is in proximity to or in contact with an input mechanism of the electronic device.

15 Claims, 10 Drawing Sheets

(56) References Cited

U.S. PATENT DOCUMENTS

| | | | |
|---|---|---|---|
| 4,618,995 A | 10/1986 | Kemp | |
| 4,639,595 A | 1/1987 | Okita | |
| 4,641,182 A | 1/1987 | Gur | |
| 4,668,911 A | 5/1987 | Mueller | |
| 5,047,629 A | 9/1991 | Geist | |
| 5,254,919 A | 10/1993 | Bridges | |
| 5,382,792 A | 1/1995 | Hurst et al. | |
| 5,748,111 A | 5/1998 | Bates | |
| 5,867,082 A | 2/1999 | Van Zeeland | |
| 6,128,006 A | 10/2000 | Rosenberg et al. | |
| 6,252,825 B1 * | 6/2001 | Perotto | G04C 3/007 368/185 |
| 6,639,206 B1 | 10/2003 | Rothamel et al. | |
| 6,707,443 B2 | 3/2004 | Bruneau et al. | |
| 6,862,832 B2 | 3/2005 | Barrett | |
| 6,882,596 B2 * | 4/2005 | Guanter | G04G 11/00 368/230 |
| 7,042,809 B2 * | 5/2006 | Mignot | G06K 9/22 368/223 |
| 7,135,673 B2 | 11/2006 | Saint Clair | |
| 7,190,638 B2 | 3/2007 | Oguchi | |
| 7,196,688 B2 | 3/2007 | Schena | |
| 7,230,959 B2 | 6/2007 | Johnson | |
| 7,265,336 B2 | 9/2007 | Hataguchi | |
| 7,385,874 B2 | 6/2008 | Vuilleumier | |
| 7,404,667 B2 | 7/2008 | Born et al. | |
| 7,520,664 B2 | 4/2009 | Wai | |
| 7,969,337 B2 | 6/2011 | Ratnakar et al. | |
| 8,002,089 B2 | 8/2011 | Jasso et al. | |
| 8,194,928 B2 | 2/2012 | Villaret | |
| 8,220,987 B2 | 7/2012 | Kimura et al. | |
| 8,305,171 B2 | 11/2012 | Kimura et al. | |
| 8,350,562 B2 | 1/2013 | Gailledrat | |
| 8,395,111 B2 | 3/2013 | Le | |
| 8,577,289 B2 | 11/2013 | Schlub et al. | |
| 8,649,004 B2 | 2/2014 | Schulz et al. | |
| 8,743,083 B2 | 6/2014 | Zanone et al. | |
| 8,759,747 B2 | 6/2014 | Ishizuka | |
| 8,783,944 B2 | 7/2014 | Doi | |
| 8,810,517 B2 | 8/2014 | Goto et al. | |
| 8,824,245 B2 | 9/2014 | Lau et al. | |
| 8,847,145 B2 | 9/2014 | Masa | |
| 9,070,648 B2 | 6/2015 | de Jong et al. | |
| 9,088,282 B2 | 7/2015 | Holenarsipur et al. | |
| 9,091,715 B2 | 7/2015 | Alameh et al. | |
| 9,188,462 B2 | 11/2015 | Omoto et al. | |
| 9,223,296 B2 | 12/2015 | Yang | |
| 9,483,031 B2 | 11/2016 | Yanagisawa | |
| 9,490,804 B2 | 11/2016 | Hanumanthaiah et al. | |
| 9,651,405 B1 | 5/2017 | Gowreesunker et al. | |
| 10,203,662 B1 | 2/2019 | Lin et al. | |
| 2001/0014618 A1 * | 8/2001 | Martin | G04G 21/04 455/575.1 |
| 2003/0201979 A1 | 10/2003 | Sandage et al. | |
| 2005/0061646 A1 * | 3/2005 | Ferri | H01R 13/6485 200/341 |
| 2007/0242569 A1 | 10/2007 | Inoue et al. | |
| 2008/0290261 A1 | 11/2008 | Doe | |
| 2010/0282955 A1 | 11/2010 | Poon | |
| 2011/0298699 A1 * | 12/2011 | Goto | G06F 3/0202 345/156 |
| 2012/0242626 A1 | 9/2012 | Hu | |
| 2013/0076375 A1 | 3/2013 | Hanumanthaiah et al. | |
| 2013/0201803 A1 * | 8/2013 | Kaltenrieder | G04G 21/08 368/280 |
| 2014/0049496 A1 * | 2/2014 | Szalkowski | G06F 3/041 345/173 |
| 2014/0180481 A1 * | 6/2014 | Park | G06F 3/0487 700/275 |
| 2015/0048242 A1 | 2/2015 | Remillard et al. | |
| 2015/0048847 A1 * | 2/2015 | Vincent | G06F 3/044 324/663 |
| 2015/0109744 A1 * | 4/2015 | Jufer | G04G 17/06 361/752 |
| 2015/0341031 A1 * | 11/2015 | Marquas | G01D 5/2417 200/600 |
| 2016/0058375 A1 | 3/2016 | Rothkopf | |
| 2016/0061636 A1 | 3/2016 | Gowreesunker et al. | |
| 2016/0069712 A1 | 3/2016 | Holenarsipur et al. | |
| 2016/0069713 A1 | 3/2016 | Holenarsipur et al. | |
| 2016/0109861 A1 * | 4/2016 | Kim | G04G 21/08 368/69 |
| 2016/0258784 A1 | 9/2016 | Boonsom et al. | |
| 2016/0313794 A1 | 10/2016 | Moussette et al. | |
| 2016/0313808 A1 | 10/2016 | Wu et al. | |
| 2017/0192538 A1 * | 7/2017 | Barel | G06F 3/03545 |
| 2017/0248446 A1 | 8/2017 | Gowreesunker et al. | |

FOREIGN PATENT DOCUMENTS

| | | | |
|---|---|---|---|
| WO | WO 15/021391 | | 2/2015 |
| WO | WO 15/030869 | | 3/2015 |
| WO | WO 15/034960 | | 3/2015 |
| WO | WO-2015-034960 | * | 3/2015 |
| WO | WO 15/122885 | | 8/2015 |

OTHER PUBLICATIONS

U.S. Appl. No. 15/103,091, filed Jun. 9, 2016, Moussette et al.
U.S. Appl. No. 14/640,376, filed Mar. 6, 2015, Gowreesunker et al.
U.S. Appl. No. 14/796,895, filed Jul. 10, 2015, Holenarsipur et al.
U.S. Appl. No. 14/841,801, filed Sep. 1, 2015, Holenarsipur et al.

* cited by examiner

PROXIMITY DETECTION FOR AN INPUT MECHANISM OF AN ELECTRONIC DEVICE

CROSS-REFERENCE TO RELATED APPLICATIONS

This application is a nonprovisional patent application of and claims the benefit of U.S. Provisional Patent Application No. 62/235,068, filed Sep. 30, 2015 and titled "Proximity Detection for an Input Mechanism of an Electronic Device," the disclosure of which is hereby incorporated herein by reference in its entirety.

FIELD

The described embodiments relate generally to proximity sensing. More particularly, the described embodiments are directed to determining proximity of an object to an input mechanism of a wearable electronic device.

BACKGROUND

Many electronic devices include one or more input devices for receiving input from a user and one or more output devices for providing output to the user. These input devices may include keyboards, mice, trackpads, buttons, knobs, microphones, and so on. Example output devices include display screens, speakers, haptic devices, and so on.

As input is received on the input device, the output provided on the output device may change. However, it may be difficult to determine when the input device is intentionally actuated such as, for example, by a finger of a user, or whether the input device is inadvertently actuated.

SUMMARY

Disclosed are various implementations for determining whether an object, such as a user's finger, is in proximity to, and/or in contact with, an input mechanism for an electronic device. When the object is in proximity to or contacting the input mechanism, a state of the input mechanism, and/or the electronic device, may change. For example the state of the input mechanism or the electronic device may change from an inactive state to an active state.

Accordingly, disclosed herein is an electronic device that incorporates a proximity sensor to detect when an object is in proximity to an input mechanism. More specifically, the electronic device may be a wearable electronic device. The wearable electronic may include a rotatable crown that is used to provide input for the wearable electronic device. The rotatable crown may be electrically isolated from a housing of the wearable electronic device. The wearable electronic device may also include a proximity sensing component that is operative to determine when an object is in proximity to, or in contact with, the rotatable crown.

Also disclosed is a wearable electronic device having a proximity sensor operative to determine when an object is in proximity to at least a portion of the electronic device. The electronic device includes an input mechanism that acts as a first component of the proximity sensor and a housing that acts as a second component of the proximity sensor. The housing is electrically isolated from the input mechanism.

The present disclosure also describes a method for determining the proximity of an object to an input mechanism of a wearable electronic device. This method includes causing the input mechanism of the wearable electronic device to act as a first component of a proximity sensor and causing a housing of the wearable electronic device to be electrically isolated from the input mechanism and to act as a second component of the proximity sensor. The proximity sensor then measures a change in an electrical signal between the input mechanism and the housing.

BRIEF DESCRIPTION OF THE DRAWINGS

The disclosure will be readily understood by the following detailed description in conjunction with the accompanying drawings, wherein like reference numerals designate like structural elements, and in which:

FIG. 2B illustrates an example schematic diagram of a capacitive sensor that may be incorporated into an example electronic device;

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to determining whether an object is in proximity to, or is in contact with, an input mechanism of an electronic device. More specifically, the described embodiments are directed to a wearable electronic device that incorporates a proximity sensor to determine whether an object, such as a user's finger, is in proximity to or is in contact with the input mechanism.

In one implementation, the proximity sensor is a resistive sensor operative to detect a change in resistance between two components of the electronic device. In another implementation, the proximity sensor is a capacitive sensor operative to detect a change in capacitance as an object approaches or contacts the electronic device. In each of these implementations, a first component of the electronic device may act as a first component of the proximity sensor and a second component of the electronic device may act as a second component of the proximity sensor.

For example, an input mechanism of the electronic device may act as the first component of the proximity sensor and the housing of the electronic device may act as the second component of the proximity sensor. Thus, when an object, such as a user's finger, approaches or contacts the input mechanism, the proximity sensor detects a change in an electric signal between the input mechanism and the housing thereby signaling proximity and/or contact.

In other embodiments described herein, proximity is detected by an optical sensor. For example, an optical sensor is positioned within the housing of the electronic device and determines, based on a sensed amount of light, when an object is approaching and/or contacting the input mechanism.

In still yet other embodiments, the electronic device incorporates one or more movement sensors, such as, for example, an accelerometer, a gyroscope and the like. These movement sensors detect when the electronic device moves in given direction. More specifically, the movement sensors detect when the electronic device moves in a particular direction in response to a user contacting the input mechanism of the electronic device. The electronic device may also include one or more force sensors that detect whether an object is contacting the input mechanism.

These and other embodiments are discussed below with reference to FIGS. 1-9. However, those skilled in the art will readily appreciate that the detailed description given herein with respect to these figures is for explanatory purposes only and should not be construed as limiting.

Figure 1:
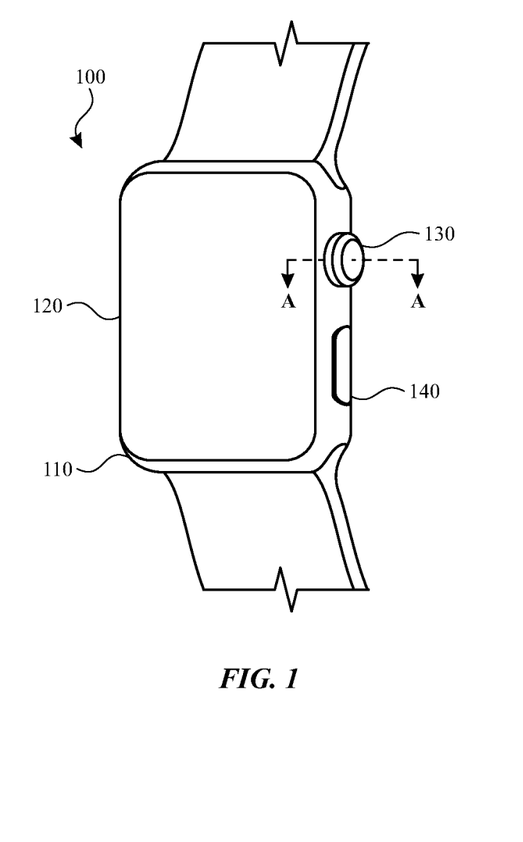
FIG. 1 shows an example electronic device that may use or incorporate a proximity sensor.

FIG. 1 illustrates an example electronic device 100 that incorporates a proximity sensor. The electronic device 100 may include a housing 110, a display 120 a first input mechanism 130 and a second input mechanism 140. The first input mechanism 130 may be a rotatable crown. The second input mechanism 140 may be a button. Although a rotatable crown and a button are mentioned, each of the first input mechanism 130 and the second input mechanism 140 may be any type of input mechanism that provides input to the electronic device 100.

As will be described below, the electronic device 100 may include one or more proximity sensors operable to detect contact with or proximity to the first input mechanism 130, the second input mechanism 140, the display 120 and/or the housing 110. More specifically, the proximity sensor is operative to detect whether a user's finger (or other object) is in contact with the first input mechanism 130 and/or whether the user's finger is in proximity to the first input mechanism 130.

In some embodiments, proximity to, or contact with, the first input mechanism 130 may alter an operating state of the electronic device 100. In another embodiment, proximity to, or contact with, the first input mechanism 130 may alter an operating state of the first input mechanism 130.

For example, a user may operate the first input mechanism 130 to alter a graphical user interface that is output on the display 120 of the electronic device 100. More specifically, a displayed element on the graphical user interface may be alterable by manipulation of the first input mechanism 130. As such, the displayed element may be changed using different manipulations of the first input mechanism 130. These manipulations may include pressing inward on the first input mechanism 130, rotating the first input mechanism 130 in a first direction, rotating the first input mechanism 130 in a second direction and so on.

However, in order to prevent inadvertent actuation of the first input mechanism 130 (or the second input mechanism 140), the graphical user interface may not be alterable and/or displayed unless the user's finger is in proximity to or in contact with the first input mechanism 130. In another example, the graphical user interface may not be presented until the user's finger is in contact with or in proximity to the first input mechanism 130. Continuing with the example, the display 120, and more specifically the electronic device 100, may be in a sleep state or other low power state. The display 120 and/or the electronic device 100 may change from a low power state to an active state (e.g., show the graphical user interface) when contact or proximity is detected.

In another example embodiment, an operating state of the first input mechanism 130 may also be altered or changed based on contact or proximity to a user's finger or other object. For example, if proximity or contact is not detected, rotation or actuation of the first input mechanism 130 will not register a change on the graphical user interface. Thus, if the first input mechanism 130 was inadvertently actuated, the electronic device 100 will not power up, register the received input and/or change the user interface.

In another example, the operating state of the first input mechanism 130 will not change so long as proximity or contact is detected. Thus, as long as proximity or contact with the first input mechanism 130 is detected, the first input mechanism 130, and more specifically the electronic device 100, is ready to register received input.

For example, if a user ceases to actuate the first input mechanism 130 for a period of time, but keeps her finger in proximity to or in contact with the first input mechanism 130, the state of the first input mechanism 130 and/or the electronic device 100 will not change (e.g., the electronic device 100 will not enter a low power or sleep state). However, once contact or proximity is no longer detected (or in embodiments when a change in an electrical signal falls below a change threshold such as will be described below) the state of the first input mechanism 130 and/or the electronic device 100 may change. For example, the electronic device 100 may enter a low power state or a sleep state.

Although a finger is specifically mentioned in the examples above, the present disclosure is not so limited. The proximity sensors described herein may be able to detect contact or proximity of other objects including, for example, a stylus or other such input device.

Although the electronic device 100 is illustrated and described as a wearable electronic device, it is understood that this is an example. In various implementations, the electronic device 100 may be a laptop computing device, a desktop computing device, a fitness monitor, a digital media player, a cellular telephone, a smart phone, a display, a printer, a mobile computing device, a tablet computing device, and/or any other electronic device without departing from the scope of the present disclosure.

FIGS. 2A-6 illustrate various cross-section views taken along line A-A of the example electronic device 100 shown and described above with respect to FIG. 1. Although different reference numbers may be used to reference similar components in the description below, like components in these figures may be configured to operate in a similar manner.

Figure 2A:
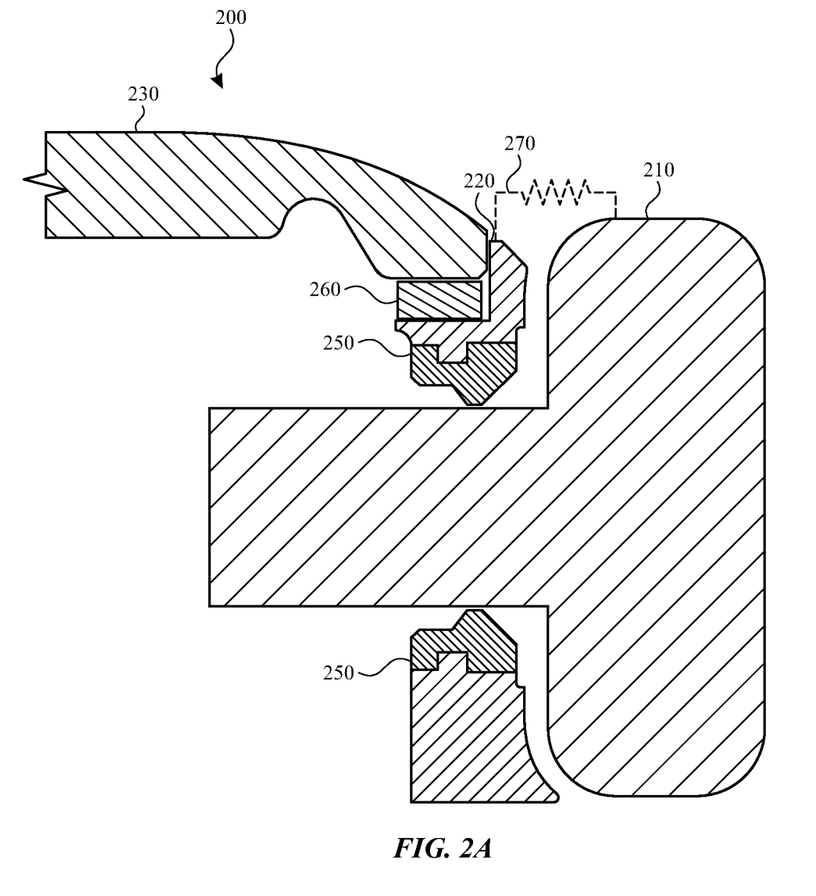
FIG. 2A illustrates a cross-section view of a first configuration of components in the example electronic device of FIG. 1 taken along line A-A.

FIG. 2A illustrates various components of an electronic device 200 arranged in a first configuration. The electronic device 200 may include an input mechanism 210 such as, for example, a rotatable crown. The input mechanism 210 may be moveable with respect to a housing 220. In some embodiments, a portion of the input mechanism 210 (e.g., a shaft of the input mechanism 210) extends through the housing 220.

The electronic device 200 also includes a display 230. The display 230 may be used as both an input device and an output device. For example, the display may include one or more touch sensors that determine a location of a user's touch on a surface of the display 230. The display 230 may also include or otherwise be associated with one or more force sensors 260 operative to determine an amount of force provided on the display 230.

Figure 2B:
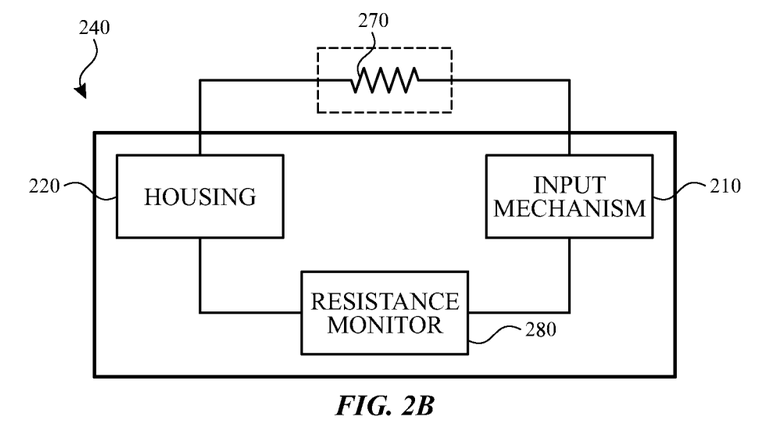
FIG. 2B illustrates an example schematic diagram of a resistive sensor that may be incorporated into an example electronic device.

The electronic device 200 may also include at least one proximity sensor 240 such as shown in FIG. 2B. The proximity sensor 240 is operative to determine whether an object, such as a user's finger, is in proximity to or is in contact with the input mechanism 210.

In the embodiment shown in FIG. 2B, the proximity sensor 240 is a resistive sensor that detects a change in an electric signal between two components of the electronic device 200. More specifically, the proximity sensor 240 is comprised of a resistance monitor 280 that is electrically coupled to the input mechanism 210 and the housing 220.

For example, one or more electrical contacts may be positioned in and/or on the input mechanism 210. The electrical contacts extend through the shaft of the input mechanism 210 and are connected to the resistance monitor 280. The resistance monitor 280 is also electrically coupled to the housing 220. As such, the input mechanism 210 acts as a first component of the proximity sensor 240 and the housing 220 acts as a second component of the proximity sensor 240.

In some embodiments, the input mechanism 210 and the housing 220 are made from metal, gold, aluminum, titanium or other such materials. In addition and as shown in FIG. 2A, the input mechanism 210, or a portion of the input mechanism 210, may extend through the housing 220. As such, and in order for the input mechanism 210 and the housing 220 to act as components of the proximity sensor 240, the input mechanism 210 and the housing 220 may be electrically isolated from one another. Accordingly, the electronic device 200 may also include an insert 250 that electrically isolates the two components.

The inserts 250 may be ceramic, rubber, plastic or other such suitable material. The inserts 250 may be coupled to a portion of the housing 220 such as shown in FIG. 2A. The inserts 250 may be integrated with or formed in the housing 220. In addition, the inserts 250 may extend from an inner portion of the housing 220 to an outer surface of the housing 220. For example, the inserts 250 may extend from the inner portion of the housing 220 to a bottom surface of the housing 220 that contacts a user's arm and to a top surface of the housing 220 near the display 230.

As discussed above, the inserts 250 electrically isolate the components of the electronic device 200. Therefore, even if contaminants (e.g., sweat, water, or other contaminants) enter a gap that exists between the input mechanism 210 and the housing 220, the inserts 250 prevent these contaminants from shorting the path between the housing 220 and the input mechanism 210.

When the input mechanism 210 and the housing 220 act as components of the proximity sensor 240 and are electrically isolated from one another, the proximity sensor 240, and more specifically the resistance monitor 280, can more accurately determine proximity or contact with the input mechanism 210 and/or the housing 220.

For example, a user's finger or other object may act as a resistor 270 and close a path between the input mechanism 210 and the housing 220. More specifically, as the resistor 270 approaches or contacts the input mechanism 210, the resistance monitor 280 of the proximity sensor 240 detects a change in resistance between the input mechanism 210 and the housing 220. Proximity or contact may then be determined based on the detected change.

In some embodiments, the proximity sensor 240 will not register proximity or contact until the detected change in resistance meets or exceeds a resistance change threshold. Further, the proximity sensor 240 may not register proximity or contact until the detected change in resistance meets or exceeds the resistance change threshold over a given time threshold. Using these thresholds, the proximity sensor 240 may be able to better distinguish between deliberate proximity and/or deliberate contact with the input mechanism 210 versus inadvertent proximity and/or inadvertent contact with the input mechanism 210.

When the proximity sensor 240 registers proximity or contact, an operating state of the electronic device 200 may change. In another embodiment, detected proximity or contact with the input mechanism 210 may change an operating state of the input mechanism 210.

For example, if the electronic device 200 is in a sleep state and proximity or contact is detected, the electronic device 200 may transition from the sleep state to an active state. In another example, the electronic device 200 may be in an active state while the input mechanism 210 is in an inactive state (e.g., actuation of the input mechanism 210 does not register a change on a user interface). Once proximity or contact is detected, the state of the input mechanism 210 may change.

In another example, a state of the electronic device 200 and/or the input mechanism 210 may not change while proximity and/or contact is detected. For example, if the electronic device 200 is an active state and proximity or contact is detected, the electronic device 200 will remain in the active state. Likewise, if input mechanism 210 is in an active state and proximity or contact is detected, the input mechanism 210 will remain in the active state. The electronic device 200 and/or the input mechanism 210 will not change state until proximity or contact is no longer detected (e.g., when the change in electric signal no longer exceeds the resistance change threshold).

As discussed above, the electronic device 200 may also include or otherwise incorporate one or more force sensors 260. The force sensors 260 may also be used to determine proximity and/or contact with the input mechanism 210 and/or the housing 220.

For example, as a user's finger or other object contacts the input mechanism 210 and/or the housing 220, the force sensor 260 may also be actuated such as, for example, by a periphery of the object or the finger. Although the actuation of the force sensor 260 may be inadvertent as the user is intending to actuate the input mechanism 210, the sensed amount of force may be used to determine that an object is contacting the input mechanism 210.

Figure 2C:
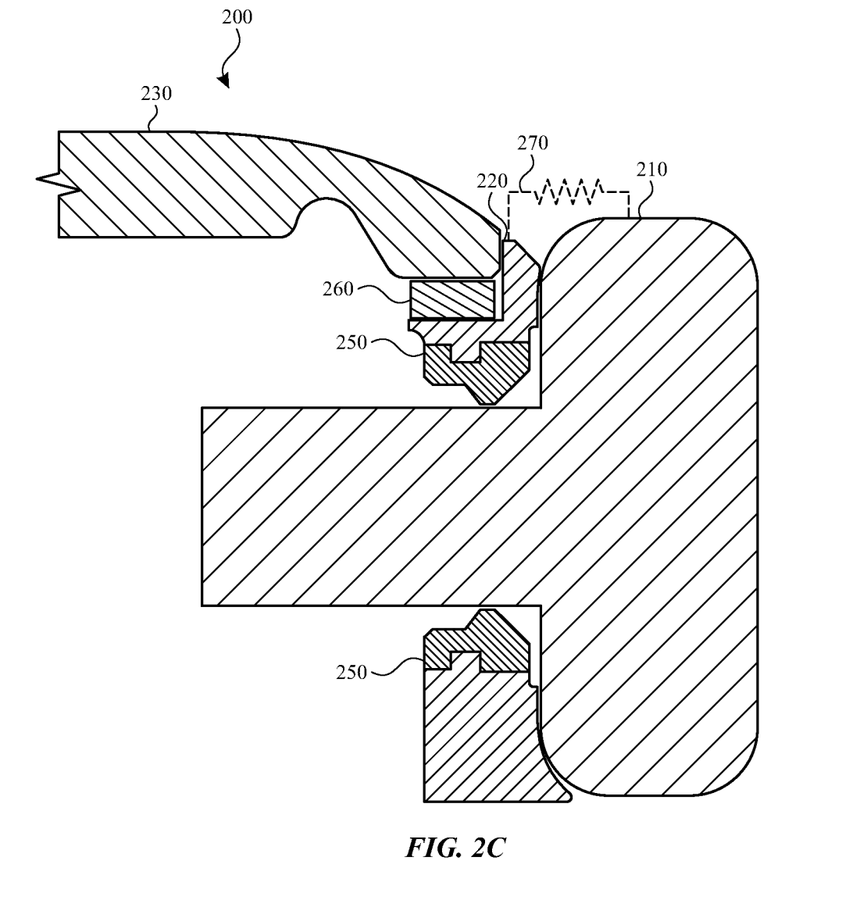
FIG. 2C illustrates a cross-section view of the first configuration of components in the example electronic device of FIG. 1 taken along line A-A in which the input mechanism has been actuated.

FIG. 2C illustrates a cross-section view of the example electronic device of FIG. 1 taken along line A-A in which the input mechanism 210 has been actuated. The input mechanism 210 may be actuated in an inward direction (e.g., in a direction toward the housing 220). As the input mechanism 210 moves toward the housing 220, the proximity sensor 240 may detect a change in resistance that indicates that the input mechanism 210 has been inwardly actuated.

Figure 3A:
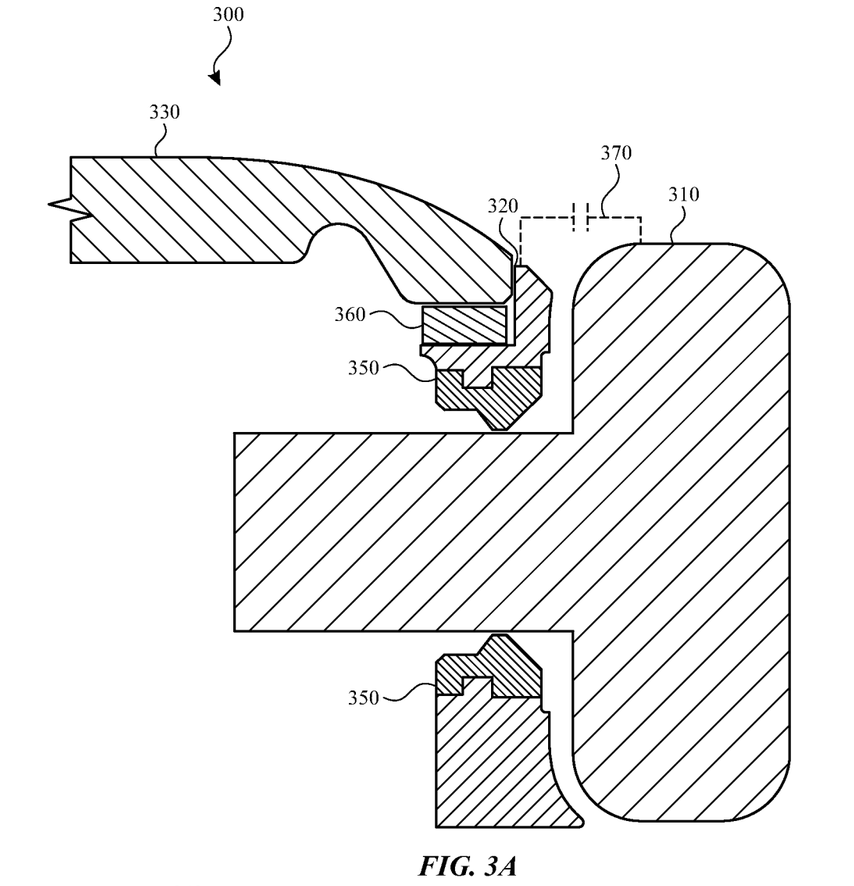
FIG. 3A illustrates a cross-section view of a second configuration of components in the example electronic device of FIG. 1 taken along line A-A.

FIG. 3A illustrates a cross-section view of a second configuration of components in an example electronic device 300. The cross-section shown in FIG. 3 may be taken along line A-A of FIG. 1.

In this example embodiment, the electronic device 300 may include an input mechanism 310, a housing 320 and a display 330. Each of these components may operate in similar manner as described above. For example, the input mechanism 310 may be a rotatable crown that extends, at least partially, into the housing 320. Actuation of the input mechanism 310 may alter output that is provided on the display 330.

Figure 3B:
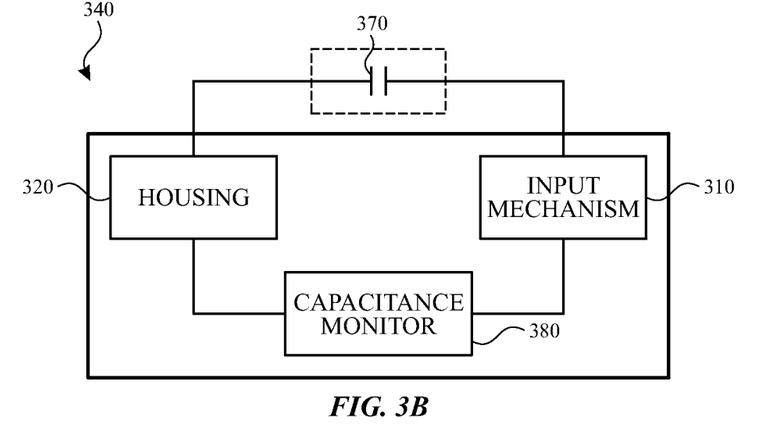

As shown in FIG. 3B, the electronic device 300 may also include a proximity sensor 340. However, in this embodiment, the proximity sensor 340 is a capacitive sensor. More specifically, the proximity sensor 340 includes a capacitance monitor 380 that is operative to detect a change in capacitance between the input mechanism 310 and the housing 320.

In this implementation, the capacitance monitor 380 may be electrically coupled to the input mechanism 310 and the housing 320. More specifically, the proximity sensor 340 may be coupled to the input mechanism 310 such that the input mechanism 310 acts as an electrode of the proximity sensor 340.

For example, an inner portion of the input mechanism 310 and/or the outer portion of the input mechanism may be conductive or made from a conductive material. As an object approaches and/or contacts the input mechanism 310, the capacitance monitor 380 detects a change in capacitance. In some embodiments, the measured change in capacitance may be self-capacitance or mutual capacitance.

In another embodiment, the housing 320 may act as the electrode of the proximity sensor 340. In yet other embodiments, both the input mechanism 310 and the housing 320 may act as electrodes. In these embodiments, the housing 320 and/or the input mechanism 310 are used to determine a change in capacitance such as described above.

In response to the detected change in capacitance, an operating state of the electronic device 300 and/or the input mechanism 310 may change such as described above. For example, when the change in capacitance exceeds a capacitance change threshold, the state of the electronic device 300 and/or the input mechanism 310 may change.

Like the embodiment shown and described with respect to FIG. 2A, the embodiment of FIG. 3A also includes one or more inserts 350. The inserts 350 provide electric isolation between the input mechanism 310 and the housing 320. The inserts 350 may extend from the inner portion of the housing 320 to the outer portion of the housing 320 such as described above.

In another implementation, the inserts 350 and/or the housing 320 may act as both an isolation component and a conductive component. For example, the inserts 350 may isolate the input mechanism 310 from the housing 320. However, contact or proximity to the input mechanism 310 modulates the housing 320 thereby eliminating any parasitic capacitance between the housing 320 and the input mechanism 310. This helps prevent a change in capacitance when liquid or other contaminants enter a gap or a space that may be present between the input mechanism 310 and the housing 320. In embodiments in which the electronic device 300 is a wearable electronic device, this configuration may prevent a change in capacitance when the wearable electronic device is worn on a wrist of a user or when the user's wrist inadvertently contacts the input mechanism 310.

The electronic device 300 may also include a force sensor 360. The force sensor 360 may include one or more capacitive elements that cause a change in capacitance as the two elements approach each other (e.g., in response to an applied force). In addition to determining an the amount of received force, these capacitive elements may be used, either separately or in combination with the proximity sensor 340, to detect a change in capacitance as an object approaches or contacts the housing 320 or the input mechanism 310.

For example, one or more capacitive elements of the force sensor 360 may be capacitively coupled with the input mechanism 310. As a finger or other object approaches or contacts the input mechanism 310, the force sensor 360 and/or the proximity sensor 340 may detect the resulting change in capacitance. Thus a determination may be made that an object is proximate to, or is in contact with, the input mechanism 310.

In certain embodiments, the proximity sensor 340 may also determine a change in capacitance as the input mechanism 310 moves in an inward direction such as described above with respect to FIG. 2C. For example, as the input mechanism 310 moves toward the housing 320 in response to being actuated, the proximity sensor 340 may detect a change in capacitance caused by the components being moved closer together thereby signaling actuation of the input mechanism.

Figure 4:
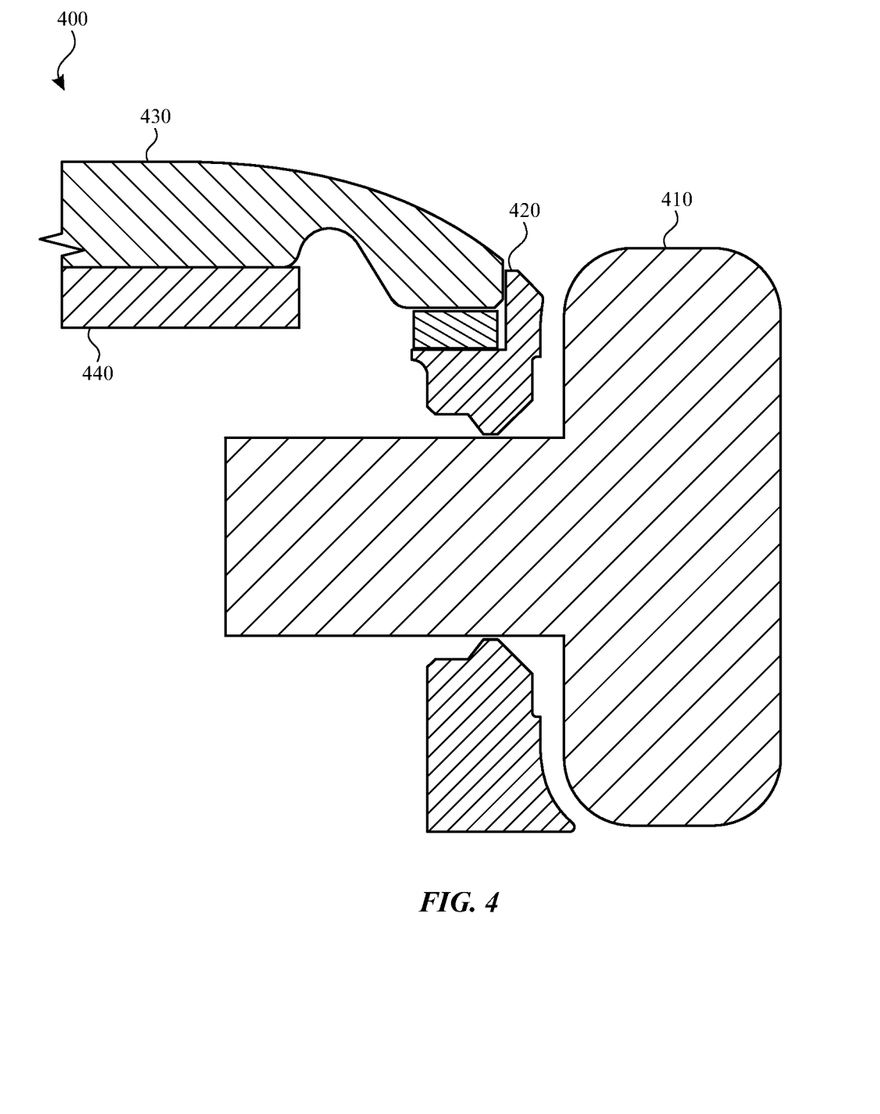
FIG. 4 illustrates a cross-section view of a third configuration of components in the example electronic device of FIG. 1 taken along line A-A.

FIG. 4 illustrates a cross-section view of a third configuration of components in an example electronic device 400. The cross-section shown in FIG. 4 may be taken along line A-A of FIG. 1.

In this example embodiment, the electronic device 400 may include an input mechanism 410, a housing 420 and a display 430. Each of these components may operate in similar manner as described above. The electronic device 400 also includes a display stack 440. The display stack 440 may include one or more touch sensors to determine a location of input received on the display 430.

More specifically, the display stack 440 may include one or more capacitive elements that detect a location of the user's finger on the display 430. However, one or more of the capacitive elements disposed on an edge of the display stack 440 (e.g., an edge closest to the input mechanism 410) may be boosted in order to detect proximity and/or contact of an object to the input mechanism 410. For example, the edge pixels of the display stack may be operative to detect a change in capacitance as an object, such as a user's finger, contacts or is in proximity to the input mechanism 410.

Figure 5:
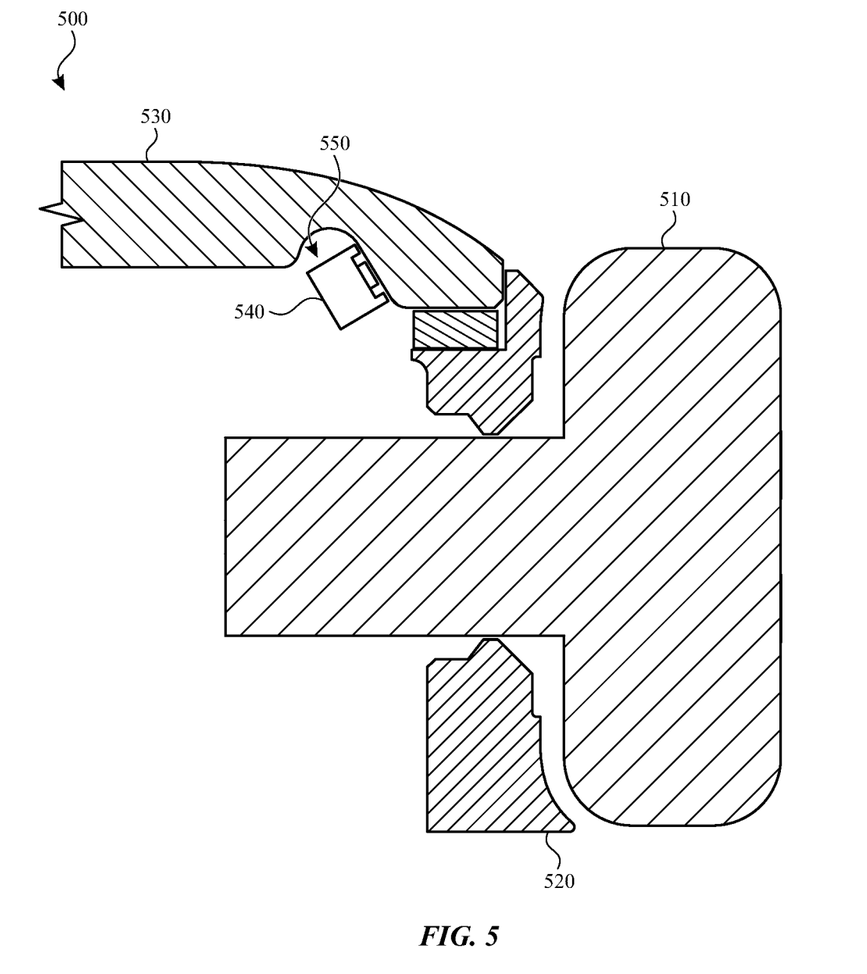
FIG. 5 illustrates a cross-section view of a fourth configuration of components in the example electronic device of FIG. 1 taken along line A-A.

FIG. 5 illustrates a cross-section view of a fourth configuration of components in an example electronic device 500. The cross-section shown in FIG. 5 may be taken along line A-A of FIG. 1.

In this example embodiment, the electronic device 500 may include an input mechanism 510, a housing 520 and a display 530. Each of these components may operate in similar manner as described above.

The proximity sensor in this particular implementation is an optical sensor 540. The optical sensor 540 may include a light source and an optical window or lens. The optical sensor 540 may be positioned in a cavity 550 formed around an inner perimeter of the display 530. In one particular embodiment, the optical sensor 540 may be positioned underneath the display 530 in the cavity 570 such as shown and oriented toward a surface of the display 530 and toward the input mechanism 510.

The light source of the optical sensor 540 may be an LED, an infrared light such as, for example an infrared LED, a laser diode, a light bulb and any other such light source. The light from the light source is transmitted though the (optional) optical window and through the display 530. When an object, such as a user's finger, contacts or is in proximity to the input mechanism 510, the optical sensor 540 detects an amount of light reflected by the user's finger and, as a result, determines proximity or contact. In another implementation, the optical sensor may be operative to sense an amount of ambient light received through the display 530. When an amount of detected light changes (e.g., when a user's finger blocks light from being received by the optical sensor as the finger moves toward the input mechanism 510), a determination may be made that an object is in proximity to or contact with the input mechanism 510. When proximity is detected, an operating state of the electronic device 500 and/or the input mechanism 510 may change such as described above.

In some embodiments, the optical sensor 540 may also be able to determine whether the input mechanism 510 is actuated, either by being rotated or by moving in an inward direction such as described above with respect to FIG. 2C. For example, the input mechanism 510 may include one or more patterns, ridges, scallops or other such surface features on an inner side. As the input mechanism 510 rotates or is moved inwardly, the light that is reflected off of the surface pattern may change thereby signaling actuation of the input mechanism 510.

Figure 6:
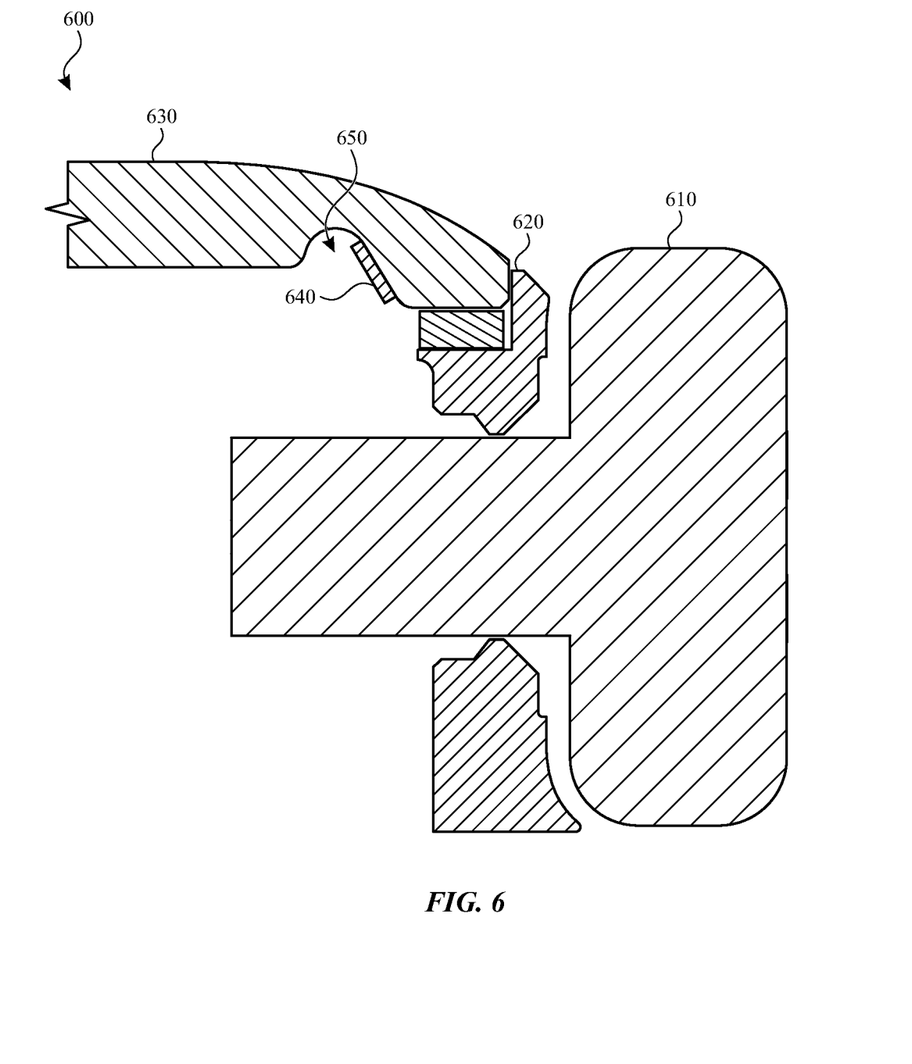
FIG. 6 illustrates a cross-section view of a fifth configuration of components in the example electronic device of FIG. 1 taken along line A-A.

FIG. 6 illustrates a cross-section view of a fifth configuration of components in an example electronic device 600. The cross-section shown in FIG. 6 may be taken along line A-A of FIG. 1.

In this example embodiment, the electronic device 600 may include an input mechanism 610, a housing 620 and a display 630. Each of these components may operate in similar manner as described above. The electronic device 600 may also include a proximity sensor 640 disposed in a channel 650 of the display 630.

The proximity sensor 640 may be a capacitive sensor operative to detect a change in capacitance as an object, such as a user's finger, approaches and/or contacts the input mechanism 610. In this particular embodiment, the proximity sensor 640 may be comprised of a flexible substrate having one or more capacitive sensing components arranged thereon. The flexible substrate is oriented to face the input mechanism 610 (e.g., has a field a view that encompasses at least a portion of the input mechanism 610) in order to better sense a change in capacitance as the user's finger approaches or otherwise contacts the input mechanism 610.

In some embodiments, the proximity sensor 640 may work in conjunction with the capacitive sensors in a display stack, such as, for example, display stack 440 shown and described above with respect to FIG. 4. More specifically, the change in capacitance sensed by the proximity sensor 640 may be combined with a change in capacitance sensed by the display stack in order to determine a location of an object in three-dimensional space. For example, if a change in capacitance detected by the proximity sensor 640 and the change in capacitance detected by the display stack exceed a threshold, a determination may be made that an object may be near or contacting the input mechanism 610 as well as a current location of the object with respect to the input mechanism 610 or a direction the object is approaching from. However, if the change in capacitance detected by one or both of these components does not exceed a threshold, the change in capacitance may be rejected.

In another embodiment, the proximity sensor 640 may be an extension from the display stack. For example a substrate, plate or other material may extend from the display stack and be coupled to the channel 650. The plate may have one or more capacitive sensors or elements that are oriented to face the input mechanism 610. These capacitive elements are used to detect proximity of a user's finger or other object to the input mechanism 610. In yet another embodiment, the proximity sensor 640 may work in conjunction with the force sensor 360 to detect a change in capacitance such as previously described.

Figure 7A:
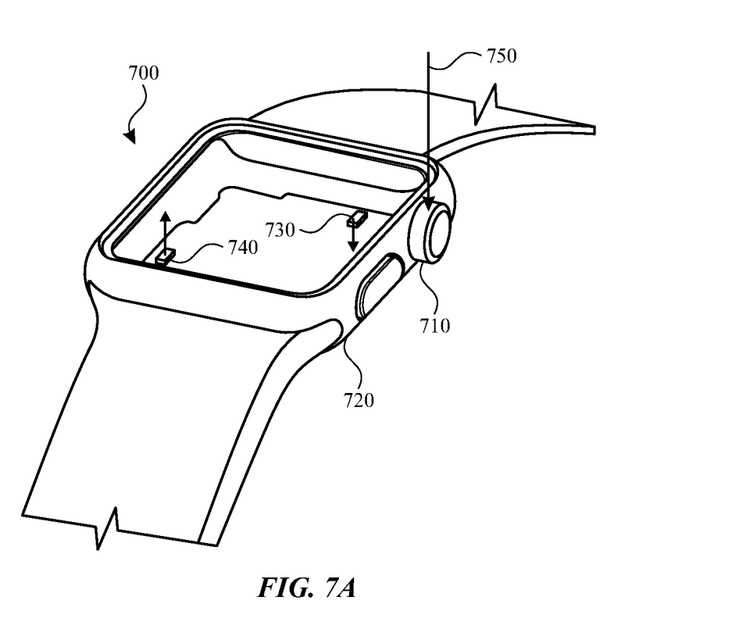
FIG. 7A illustrates an example electronic device having sensors for detecting movement of the electronic device in a first direction.
Figure 7B:
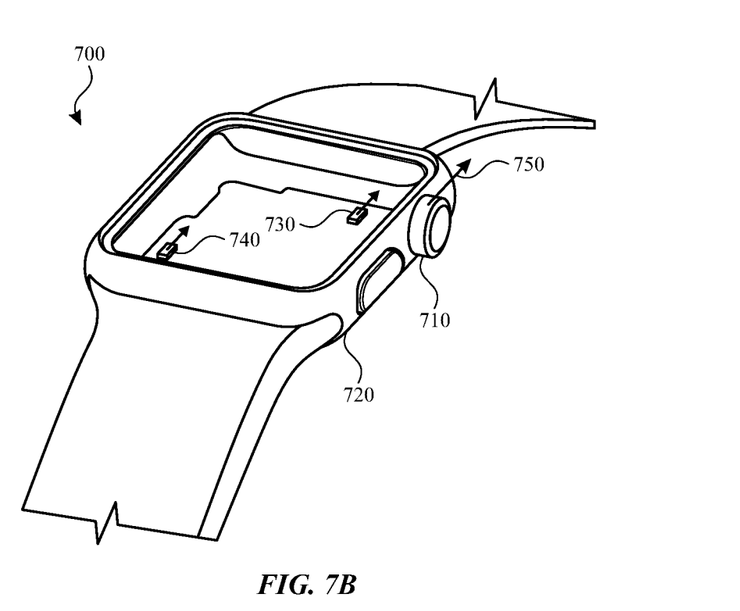
FIG. 7B illustrates an example electronic device having sensors for detecting movement of the electronic device in a second direction.

FIGS. 7A-7B illustrate an example electronic device 700 device having sensors for detecting movement of the electronic device 700 in a first direction and in a second direction respectively. The electronic device 700 includes an input mechanism 710 moveably coupled to a housing 720 and a display (not shown).

The electronic device 700 also includes a first movement sensor 730 and a second movement sensor 740. The movement sensors 730 and 740 may be located within the housing 720 of the electronic device 700. The movement sensors 730 and 740 may be an accelerometer, a gyroscope or any other suitable sensor that detects movement.

As input is received on the input mechanism 710 (e.g., such as shown by arrow 750 in FIG. 7A) the movement sensors 730 and 740 may detect movement of the housing 720 such as shown by the arrows associated with each movement sensor 730 and 740 Likewise, when input is received on the input mechanism 710 shown by arrow 750 in FIG. 7B, the housing 720 of the electronic device 700 may move in the direction indicated by the arrows associated with the movement sensors 730 and 740.

When the housing 720 of the electronic device 700 moves in these directions (or other similar directions) a determination may be made that an object, such as a user's finger, is contacting the input mechanism 710.

In additional embodiments, the movement sensors 730 and 740 may be configured to detect movement of the housing 720 that is below a movement threshold. For example, when a user contacts the input mechanism 710, the user's finger may have a natural tremor. The movement sensors 730 and 740 may be operative to sense movement of the housing 720 caused by the tremor and, as a result, determine that a user is contacting the input mechanism 710. Because the movement caused by the tremor may be slight, the movement sensors 730 and 740 may be able to distinguish movement associated with the tremor from movement caused by the user walking, riding in a car, etc. and therefore make a determination that contact has been made.

Figure 8:
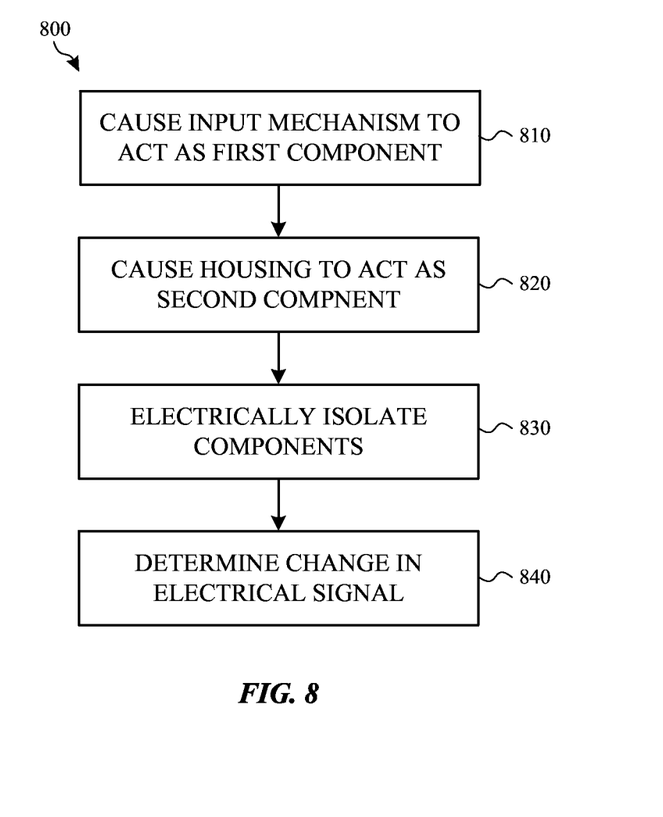
FIG. 8 illustrates a method for determining whether an object is touching or is in proximity to an input mechanism of an electronic device.

FIG. 8 illustrates a method 800 for determining whether an object is contacting or is in proximity to an input mechanism of an electronic device. The method 800 may be used by an electronic device, such as, for example, any of the electronic devices described herein.

Method 800 begins at operation 810 in which an input mechanism of the electronic device is operative to act as a first component of a force sensing device. In some embodiments, the input mechanism is a rotatable crown or other such input mechanism of the electronic device. The input mechanism may be electrically connected to a proximity sensor such as, for example, a resistive sensor or a capacitive sensor. For example, in some implementations, the input mechanism has one or more contacts disposed on a surface.

In another implementation, the input mechanism acts as an electrode for the proximity sensor.

Flow then proceeds to operation 820 and a housing of the electronic device is operative to act as a second component of the proximity sensor. Like the input mechanism described above, the housing may also be electrically connected to the proximity sensor.

Flow then proceeds to operation 830 and the housing and the input mechanism are electrically isolated from one another. In some embodiments, this is accomplished by placing an insert into the housing at a location where the input mechanism is coupled to (or through) the housing. The insert may be made of plastic, rubber, ceramic or other suitable material.

In operation 840, the proximity sensor detects a change in an electrical signal as an object, such as, for example, a user's finger, approaches or contacts the input mechanism. For example, if the proximity sensor is a resistive sensor, the electrical signal detected by the proximity sensor may change when the user's finger contacts the input mechanism. If the proximity sensor is a capacitive sensor, the capacitive sensor may detect a change in capacitance when the user's finger is in proximity to or contacting the input mechanism.

Although a resistive sensor and capacitive sensor are specifically described herein, other proximity sensors, such as those described above, may also utilize method 800, or various operations of the method 800, to determine proximity to or contact with the input mechanism of the electronic device.

Figure 9:
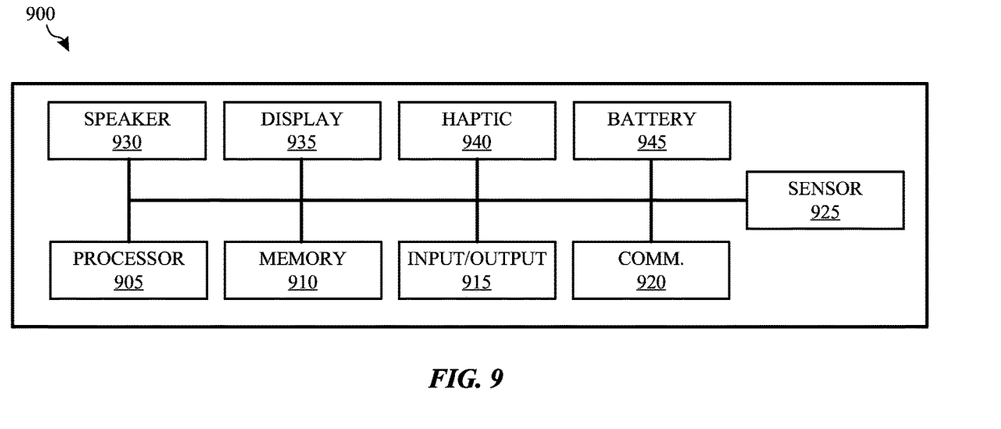
FIG. 9 illustrates example components of an electronic device.

FIG. 9 illustrates various components and modules that may be present in an example electronic device 900. More specifically, the components and modules shown and described with respect to FIG. 9 may be used or incorporated with the electronic device 100 of FIG. 1.

As shown in FIG. 9, the electronic device 900 includes at least one processor 905 or processing unit configured to access a memory 910. The memory 910 may have various instructions, computer programs, or other data stored thereon. The instructions may be configured to perform one or more of the operations or functions described with respect to the electronic device 900. For example, the instructions may be configured to control or coordinate the operation of the display 935, one or more input/output components 915, one or more communication channels 920, one or more sensors 925, a speaker 930, and/or one or more haptic actuators 940.

The processor 905 may be implemented as any electronic device capable of processing, receiving, or transmitting data or instructions. For example, the processor 905 can be a microprocessor, a central processing unit (CPU), an application-specific integrated circuit (ASIC), a digital signal processor (DSP), or combinations of such devices.

The memory 910 can store electronic data that can be used by the electronic device 900. For example, the memory 910 can store electrical data or content such as, for example, audio and video files, documents and applications, device settings and user preferences, timing and control signals or data for the various modules, data structures or databases, and so on. The memory 910 may also store instructions for determining changes in resistance, capacitance, detected light and so on such as described above.

The memory 910 may be any type of memory such as, for example, random access memory, read-only memory, Flash memory, removable memory, or other types of storage elements, or combinations of such devices.

As briefly discussed above, the electronic device 900 may include various input and output components represented in FIG. 9 as Input/Output 915. Although the input and output components are represented as a single item, the electronic device 900 may include a number of different input components, including buttons, input surfaces, microphones, switches, rotatable crowns and dials for accepting user input. The input and output components may include one or more touch sensor and/or force sensors such as described above. For example, the display 935 may be comprised of a display stack that includes one or more touch sensors and/or one or more force sensors that enable a user to provide input to the electronic device 900.

The electronic device 900 may also include one or more communication channels 920. These communication channels 920 may include one or more wireless interfaces that provide communications between the processor 905 and an external device or other electronic device. In general, the one or more communication channels 920 may be configured to transmit and receive data and/or signals that may be interpreted by instructions executed on the processor 905. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

The electronic device 900 may also include one or more sensors 925. Although a single representation of a sensor 925 is shown in FIG. 9, the electronic device 900 may have many sensors. These sensors may include resistive sensors, light sensors, capacitive sensors, biometric sensors, temperature sensors, accelerometers, gyroscopes, barometric sensors, moisture sensors and so on.

One or more one or more acoustic modules or speakers 930 may also be included in the electronic device 900. The speaker 930 may be configured to produce an audible sound or an acoustic signal.

As also shown in FIG. 9, the electronic device 900 may include one or more haptic actuators 940. The haptic actuators 940 may be any type of haptic actuator including rotational haptic devices, linear haptic actuators, piezoelectric devices, vibration elements, and so on. The haptic actuator 940 is configured to provide punctuated and distinct feedback to a user of the electronic device 900.

In certain embodiments, the electronic device 900 may include an internal battery 945. The internal battery 945 may be used to store and provide power to the various components and modules of the electronic device 900 including the haptic actuator 940. The battery 945 may be configured to be charged using a wireless charging system although a wired charging system may also be used.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wearable electronic device, comprising:
a rotatable crown, electrically connected to a shaft;
a housing, electrically isolated from the rotatable crown and the shaft; and
a proximity sensing component operative to determine when an object exterior to the wearable electronic device is in proximity to the rotatable crown,
wherein:
the housing acts as a first electrode of the proximity sensing component and is electrically connected to the proximity sensing component;
the rotatable crown and the shaft act as a second electrode of the proximity sensing component, the shaft is electrically connected to the proximity sensing component, and the shaft extends through an opening in the housing; and
the proximity sensing component is configured to determine a proximity of the object to the rotatable crown based on a change in a capacitance between the housing and the rotatable crown.

2. The wearable electronic device of claim 1, wherein the proximity sensing component is part of a display stack contained within the housing.

3. The wearable electronic device of claim 1, wherein the proximity sensing component is integrated with a force sensing device.

4. The wearable electronic device of claim 1, wherein the housing is electrically isolated from the rotatable crown by at least one insert separating the housing and the rotatable crown.

5. The wearable electronic device of claim 4, wherein the at least one insert supports the shaft of the rotatable crown.

6. The wearable electronic device of claim 1, wherein the proximity sensing component is configured to indicate the object is proximate to the rotatable crown when the change in capacitance exceeds a capacitance change threshold.

7. The wearable electronic device of claim 6, wherein the proximity sensing component triggers a change in a state of the wearable electronic device when the change in capacitance exceeds the capacitance change threshold.

8. A wearable electronic device, comprising:
a proximity sensor operative to determine when an object exterior to the wearable electronic device is in proximity to at least a portion of the wearable electronic device;
an input mechanism having an exterior contact surface that is electrically connected to the proximity sensor and acts as a first electrode of the proximity sensor; and
a housing of the wearable electronic device that is electrically connected to the proximity sensor and acts as a second electrical component electrode of the proximity sensor,
wherein:
the housing is electrically isolated from the input mechanism;
the input mechanism extends through an opening in the housing;
the input mechanism is operable to be moved in a direction toward the housing; and
the proximity sensor is configured to determine when the object is in proximity to the input mechanism based on a change in a capacitance between the housing and the input mechanism.

9. The wearable electronic device of claim 8, wherein the input mechanism is a rotatable crown.

10. The wearable electronic device of claim 8, wherein the housing comprises an insert that electrically isolates the input mechanism and the housing.

11. The wearable electronic device of claim 10, wherein the insert is one of plastic, ceramic, or rubber.

12. A method for determining proximity of an object to an input mechanism of a wearable electronic device, the object being exterior to the wearable electronic device, the method comprising:
causing the input mechanism of the wearable electronic device to act as a first electrode of a proximity sensor, the input mechanism having an exterior contact surface that is electrically connected to the proximity sensor;
causing a housing of the wearable electronic device to act as a second electrode of the proximity sensor, wherein the housing is electrically connected to the proximity sensor and is electrically isolated from the input mechanism; and
measuring, by the proximity sensor, a change in a capacitance between the input mechanism and the housing;
wherein the input mechanism is operable to be moved in a direction toward the housing.

13. The method of claim 12, further comprising altering output provided on a display of the wearable electronic device when the change in the capacitance exceeds a threshold.

14. The method of claim 12, further comprising:
causing the input mechanism to remain in an active state when the change in the capacitance exceeds a threshold; and
causing the input mechanism to transition to an inactive state when the change in the electrical signal is below the threshold.

15. The method of claim 12, wherein:
the input mechanism comprises a rotatable crown that is electrically connected to a shaft that extends through the housing; and
the user contact surface is on the rotatable crown.

* * * * *

UNITED STATES PATENT AND TRADEMARK OFFICE
CERTIFICATE OF CORRECTION

PATENT NO. : 10,503,271 B2
APPLICATION NO. : 14/936421
DATED : December 10, 2019
INVENTOR(S) : Colin M. Ely et al.

Page 1 of 1

It is certified that error appears in the above-identified patent and that said Letters Patent is hereby corrected as shown below:

Claim 8, Line 55 should read: second electrode of the proximity

Signed and Sealed this
Third Day of March, 2020

Andrei Iancu
*Director of the United States Patent and Trademark Office*